(12) United States Patent
Park

(10) Patent No.: US 8,315,232 B2
(45) Date of Patent: Nov. 20, 2012

(54) APPARATUS AND METHOD FOR DISPLAYING AVAILABILITY OF WIRELESS LAN

(75) Inventor: Soo-hong Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 731 days.

(21) Appl. No.: 11/417,138

(22) Filed: May 4, 2006

(65) Prior Publication Data

US 2006/0251034 A1 Nov. 9, 2006

(30) Foreign Application Priority Data

May 6, 2005 (KR) .......................... 10-2005-0038118

(51) Int. Cl.
  *H04W 4/00* (2009.01)
(52) U.S. Cl. ........ 370/338; 370/439; 370/447; 370/461; 370/462; 370/910; 455/145; 455/154.2; 455/158.4; 455/434; 455/515; 710/17; 710/18; 710/19; 710/43
(58) Field of Classification Search .................. 455/145, 455/154.2, 158.4, 434, 515; 370/338, 439, 370/447, 461, 462, 910, 39, 33; 710/17, 710/18, 19, 43
See application file for complete search history.

(56) References Cited

U.S. PATENT DOCUMENTS

| 6,141,688 | A * | 10/2000 | Bi et al. ........................ 709/227 |
| 6,295,454 | B1 * | 9/2001 | Havinis et al. ............. 455/456.3 |
| 6,618,434 | B2 | 9/2003 | Heidari-Bateni et al. |
| 2002/0064141 | A1 | 5/2002 | Sakakura |
| 2003/0118015 | A1 | 6/2003 | Gunnarsson et al. |
| 2004/0014474 | A1 | 1/2004 | Kanada |
| 2004/0043766 | A1 | 3/2004 | Sashihara |
| 2004/0044887 | A1 | 3/2004 | Park et al. |
| 2004/0127252 | A1 | 7/2004 | Tsunomoto et al. |
| 2004/0152480 | A1 | 8/2004 | Willars et al. |
| 2004/0176024 | A1 | 9/2004 | Hsu et al. |

(Continued)

FOREIGN PATENT DOCUMENTS

EP  1 394 988 A2  3/2004

(Continued)

OTHER PUBLICATIONS

Office Action issued Apr. 18, 2007 by the Korean Intellectual Property Office re: Korean Patent Application No. 2005-38118 (3 pp).

(Continued)

*Primary Examiner* — Nimesh Patel
(74) *Attorney, Agent, or Firm* — Staas & Halsey LLP

(57) ABSTRACT

An apparatus and a method to display the availability of a wireless LAN, in which information about an area supporting a wireless local area network (LAN) is provided to a user carrying a mobile terminal, such as a mobile phone through a mobile phone network in the form of text, voice or images. The apparatus includes: an input unit to receive a command to request a search for a wireless LAN available in a designated location from a user; a packet generating unit to generate an information request packet according to the received command; a communicating unit to transmit the generated information request packet and to receive a result of the requested search for the available wireless LAN, in response to the transmitted information request packet; and a display unit to display the received result of the search.

32 Claims, 10 Drawing Sheets

U.S. PATENT DOCUMENTS

| | | | |
|---|---|---|---|
| 2004/0205158 A1* | 10/2004 | Hsu | 709/218 |
| 2005/0136942 A1* | 6/2005 | Timiri et al. | 455/456.1 |

FOREIGN PATENT DOCUMENTS

| | | |
|---|---|---|
| EP | 1 395 077 A1 | 3/2004 |
| EP | 1395 077 A1 | 3/2004 |
| EP | 1 597 867 | 6/2009 |
| JP | 11-313373 | 11/1999 |
| JP | 2002-164919 | 6/2002 |
| JP | 2002-206632 | 8/2002 |
| JP | 2002-236632 | 8/2002 |
| JP | 2004-350054 | 12/2004 |
| JP | 2005-033707 | 2/2005 |
| JP | 2005-086451 | 3/2005 |
| KR | 2002-59073 | 7/2002 |
| KR | 2003-47476 | 6/2003 |
| KR | 2004-213 | 1/2004 |
| WO | WO 02/098012 | 12/2002 |
| WO | WO 2004/077752 | 9/2004 |
| WO | WO 2004/077753 | 9/2004 |
| WO | WO 2005/025137 | 3/2005 |
| WO | WO 2005/029888 | 3/2005 |

OTHER PUBLICATIONS

Written Opinion issued on May 11, 2007 by the International Preliminary Examining Authority for International Application No. PCT/KR2006/001708.

Yoshino et al. "NAMBA: Location-Aware Collaboration System for Shopping and Meeting." IEEE Transactions on Consumer Electronics, vol. 48, No. 3, Aug. 2002, pp. 470-477.

International Search Report dated Aug. 1, 2006 issued in Korean Patent Application No. 2006/001708.

Office Action issued in corresponding Russian Patent Application No. 2007140891 dated Mar. 25, 2009.

Office Action issued by the State Intellectual Property Office of the People's Republic of China on Jun. 5, 2009.

European Search report Issued Mar. 23, 2012 in European Patent Application No. 06768475.3-2412/1878164.

* cited by examiner

"AP IS LOCATED IN BUILDING 150M IN SOUTH-EAST DIRECTION , SO YOU CAN USE WIRELESS LAN AFTER MOVING AT LEAST 50M IN SOUTH-EAST DIRECTION"

APPARATUS AND METHOD FOR DISPLAYING AVAILABILITY OF WIRELESS LAN

CROSS-REFERENCE TO RELATED APPLICATIONS

This application claims the benefit of Korean Application No. 2005-38118, filed May 6, 2005, in the Korean Intellectual Property Office, the disclosure of which is incorporated herein by reference.

BACKGROUND OF THE INVENTION

1. Field of the Invention

Aspects of the invention relate to an apparatus and a method to display an availability of a wireless local area network (LAN), and, more particularly, to an apparatus and a method to display an availability of a wireless LAN, in which information about an area supporting a wireless LAN is provided to a user carrying a mobile phone in the form of text, voice, or images.

2. Description of the Related Art

A wireless local area network (LAN) such as 802.11, 802.11a, 802.11b, and 802.11g are wireless network standards that transmit data at 11 to 54 Mbps using the Ethernet protocol, in particular, a Carrier Sense Multiple Access/Collision Avoidance (CSMA/CA) protocol, for route sharing. In addition to an 802.11-based wireless LAN, an 802.16e-based wireless network has been developed. The "WiBro (wireless broadband)" is an Internet service that uses frequencies in the 2.3 GHz band to provide mobility at more than 60 km/hr and transmission speeds equivalent to 1 Mpbs. Since the maximum propagation distance of WiBro is 48 km, its service coverage is 10 times larger than a wireless LAN, which is available only in a service area called a hot spot.

A laptop or a personal digital assistant (PDA) participating in a wireless network is referred to as a station that can exchange data with other stations or connect to the Internet by connecting to an access point (AP) that is a bridge between the wired domain and the wireless domain. A user who desires to use a wireless network can connect to a LAN using a mobile phone network. The wireless network using the mobile phone network, in which a base station relays connections between a wireless domain and a wired domain, allows users within the area of the mobile phone network to use the wireless network, but typically is expensive to use.

FIG. 1 illustrates a connection to a LAN using a conventional wireless network. A wireless LAN 11, which provides a wireless network service using an access point (AP) that is a bridge between a wired domain and a wireless domain, is widely used among wireless networks to connect to a LAN 10. The wireless LAN 11 is typically not expensive to use, but its AP generally has a narrow propagation distance.

A WiBro 12, to provide a wireless network service using a radio access station that bridges a wireless domain and a wired domain, is a domestic portable Internet service based on IEEE 802.16e. The WiBro 12 typically has an advantage of a wider propagation distance over the wireless LAN 11. A mobile phone network 13, to provide a wireless network service using a base station that bridges a wireless domain and a wired domain, allows a terminal within the propagation distance of a base station, such as the cell area of the base station, to connect to the LAN 10 and can provide a seamless network service during movement between cells.

The mobile phone network 13 generally has higher mobility and wider propagation distance than the WiBro 12, but is usually expensive to use. Thus, most users primarily use the wireless LAN 11. With the commercialization of the WiBro 12, widespread use of the WiBro 12 is expected to occur. However, a user who desires to connect to a wireless network using a user terminal, such as a laptop or a PDA, can experience difficulty in recognizing whether a wireless network service, such as the wireless LAN 11 or the WiBro 12, is available in its current location. In this regard, the user typically visually checks to see if an AP or a radio access station is located nearby or use the user terminal to check if an AP or a radio access station is accessible. Such checking to determine if an AP or a radio access station is accessible is usually inconvenient and often requires having to wait for completion of booting after turning on the terminal.

Korean Unexamined Patent Publication No. 2004-0000213 discloses an Internet connecting method with a user's terminal using a heterogeneous network as a connection network, in which a search is made to determine a network environment available in a user's current location. The disclosed technique checks if a wireless LAN to provide a wireless LAN service or a code division multiple access (CDMA) service is available in the user's current location, and then provides one of the wireless LAN service and the CDMA service according to the check result of the service availability. Since the disclosed technique checks if a wireless LAN is supported near or around the user's current location and then provides an available network service, the user can unintentionally use a mobile communication network that has relatively high charges in view of a lack of information about the availability of the wireless LAN, such as after short-range movement by the user.

SUMMARY OF THE INVENTION

Several aspects and example embodiments of the invention provide an apparatus and a method to display the availability of a wireless LAN, in which information about an area supporting a wireless LAN is provided to a user carrying a mobile phone through a mobile phone network, in the form of text, voice, or images. Also, aspects and exemplary embodiments of the invention provide an apparatus and a method to display the availability of a wireless LAN, in which information about an area supporting a wireless LAN is provided according to a user's movement route in the form of text, voice, or images.

According to aspects of the invention, there is provided an apparatus to display the availability of a wireless local area network (LAN), the apparatus including: an input unit to receive a command to request a search for a wireless LAN available in a designated location from a user; a packet generating unit to generate an information request packet according to the received command; a communicating unit to transmit the generated information request packet and to receive a result of the requested search for the available wireless LAN, in response to the transmitted information request packet; and a display unit to display the received result of the search.

According to further aspects of the invention, there is provided an apparatus to notify a user of the availability of a wireless local area network (LAN), the apparatus including: a storing unit to store a wireless LAN database; a receiving unit to receive an information request packet for a wireless LAN available in a specific, selected or predetermined, location; a searching unit to search for the wireless LAN available in the specific, selected or predetermined, location by referring to the stored wireless LAN database, in response to the received information request packet; and a transmitting unit to transmit information on the available wireless LAN found by the search.

According to still other aspects of the invention, there is provided a method of displaying the availability of a wireless local area network (LAN), the method including: receiving a command to request a search for a wireless LAN available in a designated location; generating an information request packet according to the received command; transmitting the generated information request packet to request the search for the wireless LAN available in the designated location and receiving the result of the requested search for the available wireless LAN, in response to the transmitted information request packet; and displaying the received result of the search for the available wireless LAN.

According to a further aspects of the invention, there is provided a method of notifying a user of the availability of a wireless local area network (LAN), the method including: storing a wireless LAN database; receiving an information request packet to request a search to determine if a wireless LAN is available in a specific, selected or predetermined, location; searching to determine the wireless LAN available in the specific, selected or predetermined location by referring to the stored wireless LAN database, in response to the received information request packet; and transmitting information on the available wireless LAN found by the search.

Additional aspects and/or advantages of the invention are set forth in the description which follows or are evident from the description, or can be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
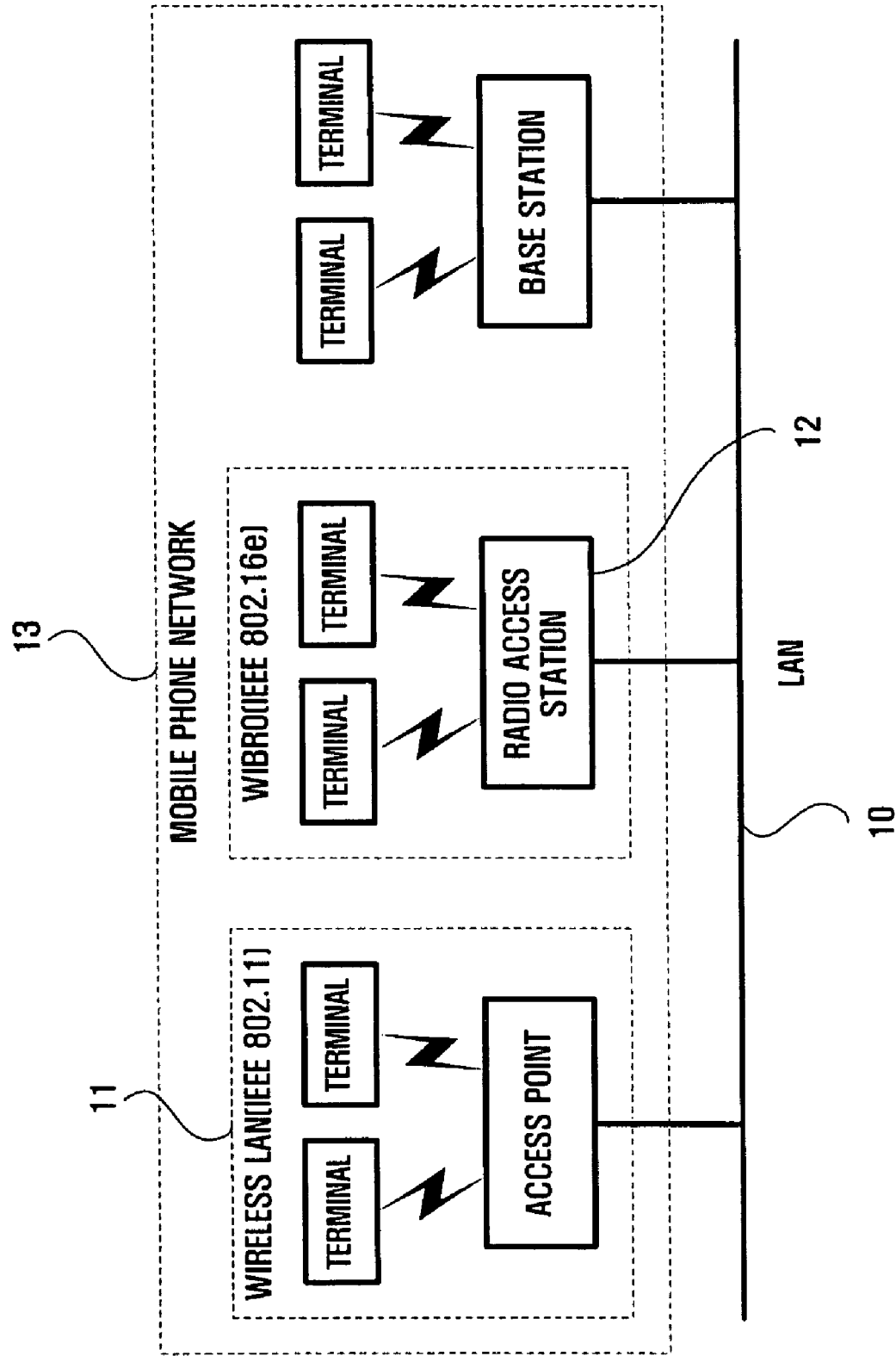
FIG. 1 illustrates a connection to a local area network (LAN) using a conventional wireless network operation.

Reference will now be made in detail to embodiments of the invention, examples of which are illustrated in the accompanying drawings, wherein like reference numerals refer to the like elements throughout. The embodiments are described below in order to explain aspects of the invention by referring to the figures, with well-known functions or constructions not necessarily being described in detail.

Figure 2:
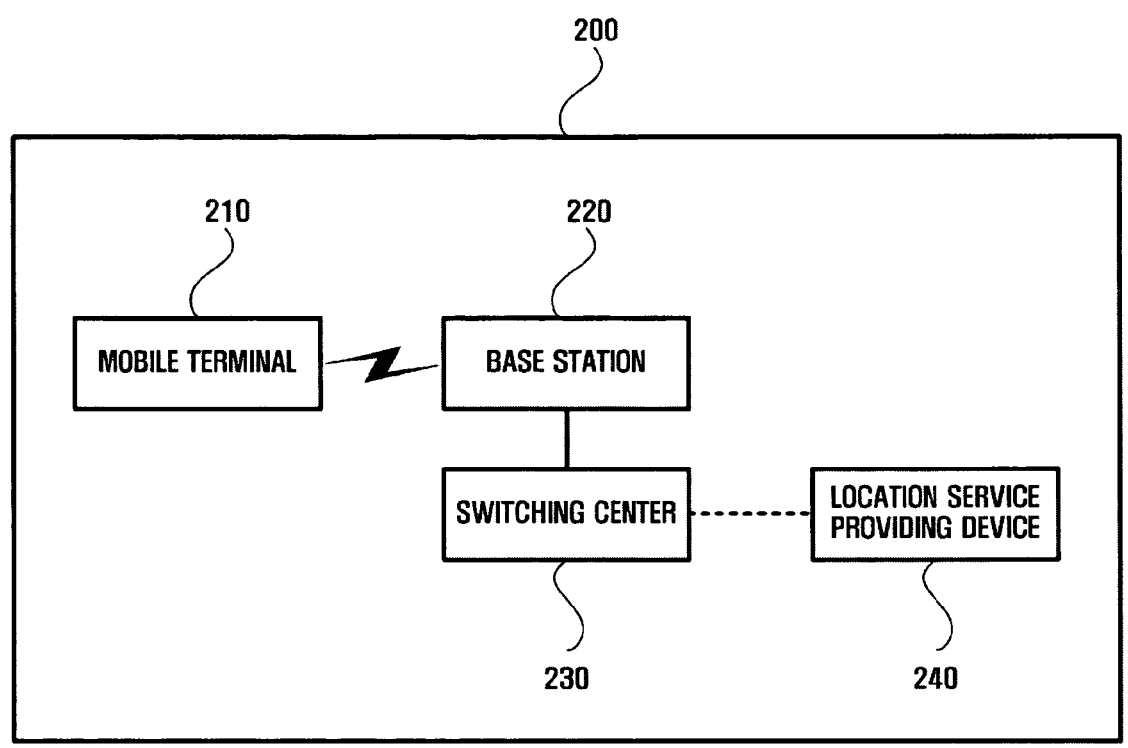
FIG. 2 is a block diagram of an apparatus to display the availability of a wireless LAN according to an embodiment of the invention.

FIG. 2 is a block diagram of an apparatus 200 to display the availability of a wireless local area network (LAN) according to an embodiment of the invention. The apparatus 200 includes a mobile terminal 210, a base station 220, a switching center 230, and a location service providing device 240.

The mobile terminal 210 is carried by a user to provide service. The mobile terminal 210 tracks its current location, which is a search-requested location, transmits the current location to the location service providing device 240, receives information about an available wireless LAN in the search-requested location, in response to the transmitted search-requested location, and displays the received information. If there is no available wireless LAN in the search-requested location, location information of a wireless LAN located near or around the search-requested location can be received and displayed.

For example, the current location of the mobile terminal 210 corresponds to the spatial coordinates of the mobile terminal 210 that can be tracked, such as by using a global positioning system (GPS) or a mobile phone network. Thus, to track the current location of the mobile terminal 210 using the GPS, a GPS receiver can be embedded in the mobile terminal 210 or a separate GPS receiver can be connected to the mobile terminal 210. To track the current location of the mobile terminal 210 using the mobile phone network, a device having a location tracking system can be further included in or associated with the mobile phone network and/or the mobile terminal 210 according to aspects of the invention.

Also, the wireless LAN typically operates a wireless LAN repeater to provide a wireless LAN service to a corresponding wireless terminal, such as to mobile terminal 210. The wireless LAN repeater is a device that is connected to a LAN to operate as a bridge between a wired domain and a wireless domain in each service providing a wireless LAN. Thus, the wireless terminal in each wireless LAN can connect to the LAN through the wireless LAN repeater. The wireless LAN repeater can be an access point (AP) of the wireless LAN or a radio access station of WiBro (wireless broadband), for example.

The user can input to the mobile terminal 210 a user-designated location. Upon input of the user-designated location, the mobile terminal 210 transmits the user-designated location as the search-requested location to the location service providing device 240, typically without tracking the current location using the GPS or the mobile phone network. To input the user-designated location, the user can use a button included in the mobile terminal 210 or voice input to the mobile terminal 210, for example. The input user-designated location can include, for example, the spatial coordinates or address of the search-requested location or the name of a prominent building or landmark near, around or in the search-requested location. If the user-designated location is input using voice input, the input voice is converted by a converter into a predetermined packet that can be recognized by the location service providing device 240, and the converter can be included in the mobile terminal 210 or the location service providing device 240, for example.

The base station 220 is a radio transceiver of the mobile phone network around which a cell is established. The base station 220 typically uses a radio-link protocol of the mobile terminal 210 for radio communication with the mobile terminal 210. The base station 220 is a component of the mobile phone network and all signals are transmitted or received through the base station 220.

The switching center 230 performs overall control of a service, such as analyzing a signal received from the base station 220 to interpret a called number and checking the adequacy of a call for call connection. According to aspects of the invention, the switching center 230 is directly or indirectly connected with the location service providing device 240 and substantially connects the mobile terminal 210 with the position service providing device 240.

The location service providing device 240 searches for the type of a wireless LAN available in the search-requested location received from the mobile terminal 210 with reference to a stored wireless LAN database and transmits the found type of a wireless LAN available in the search-requested location determined from the search. If there is no wireless LAN available in the search-requested location, location information of a wireless LAN located around or near the search-requested location can be searched, determined and transmitted as the result of the search. The wireless LAN database associated with the search to determine or find a wireless LAN available in, around or near the search-requested location can include, for example, at least one of the coordinates of a repeater for each type of wireless LAN, a table including the radio range of the repeater, and/or a map created according to the table. Also, the found type(s) of the wireless LAN determined from the search and the location information of the repeater can be transmitted in a suitable form, such as in the form of text, images, or voice.

Figure 3:
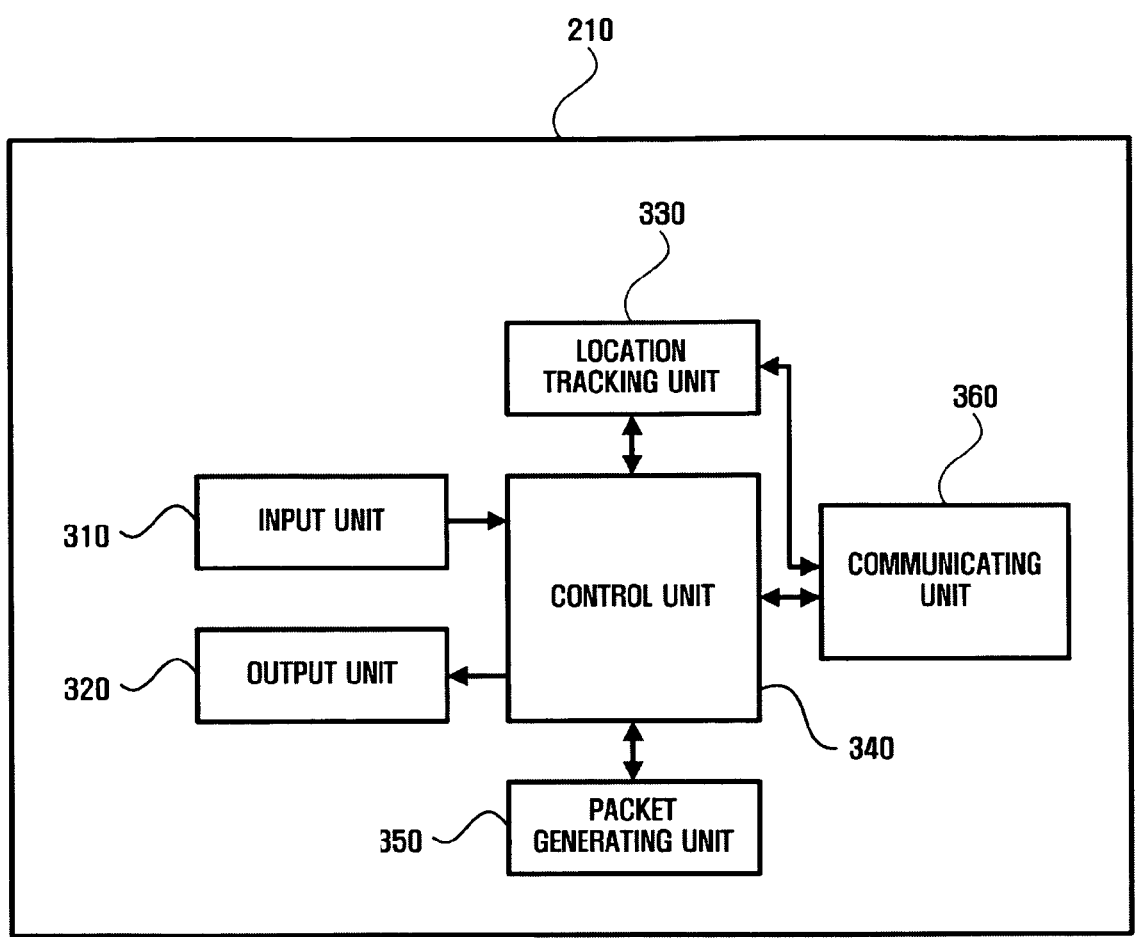
FIG. 3 is a block diagram of a mobile terminal that displays the availability of a wireless LAN according to an embodiment of the invention.

FIG. 3 is a block diagram of the mobile terminal 210 that displays the availability of a wireless LAN according to an embodiment of the invention. The mobile terminal 210 includes an input unit 310, a display unit 320 as an output unit, a location tracking unit 330, a control unit 340, a packet generating unit 350, and a communicating unit 360. The input unit 310 receives a command to request a search for an available wireless LAN from a user. The user can input the command to the input unit 310 as, for example, using a button included in the mobile terminal 210 or using voice input. The command can include at least one of a command signature, a user-designated location, or a movement route. The command signature is a data field indicating that the received command is a command to request a search for an available wireless LAN.

The control unit 340 checks if the command signature is included in the received command and controls the location tracking unit 330, the packet generating unit 350, and the communicating unit 360 to perform corresponding functions to receive information about, or corresponding to, the available wireless LAN. The control unit 340 can be any suitable processing device, such as a processor, microprocessor or an application specific integrated circuit (ASIC), with associated memory and software or programming, to control the operations of the mobile terminal 210.

The user-designated location is input by the user. In response to input of the user-designated location, the location tracking unit 330 transmits the input user-designated location to the location service providing device 240 as the search-requested location, typically without tracking the current location of the mobile terminal 210. To input the user-designated location to the input unit 310, the user can, for example, use the corresponding button included in the mobile terminal 210 or voice input. The input user-designated location can include, for example, the spatial coordinates or address of the search-requested location, or a main building name or a landmark near, around or in the search-requested location. If the user-designated location is input using voice input, the input voice is converted by a predetermined converter into a predetermined packet that can be recognized by the location service providing device 240. The converter can, for example, be included in or associated with the mobile terminal 210 or the location service providing device 240.

The movement route is input to the input unit 310 to facilitate the use of a wireless LAN where the user desires to move so as to locate to a different location or destination. In this regard, the user can input to the input unit 310 a departure point, an intermediate point, and a destination point as the movement route. The location service providing device 240, based on the input movement route, can provide an optimal route to promote enabling a smooth, or seamless, use of the wireless LAN to provide service on the input movement route.

Further, according to aspects of the invention, the user can selectively input the contents or information of or in relation to the movement route. For example, the user can input only the intermediate point and the destination point, or the departure point and the destination point. Where the user inputs the intermediate point and the destination point, the location service providing device 240 typically regards the current location as the departure point and an optimal route for the destination point via the intermediate point. Where the user inputs the departure point and the destination point, the location service providing device 240 typically provides an optimal route from the departure point and the destination point. If the departure point is input to the input unit 310, the user-designated location typically can be neglected and the location tracking unit 330 does not necessarily track the current location of the mobile terminal 210.

The location tracking unit 330 typically tracks the current location of the mobile terminal 210, if the received command does not include the user-designated location and the movement route. The current location refers to the spatial coordinates of the mobile terminal 210 and can be tracked, such as by using the GPS or the mobile phone network, for example. In this regard, to track the current location using the GPS, a GPS receiver can, for example, be embedded in or connected to the mobile terminal 210. To track the current location using the mobile phone network, the mobile terminal 210 can receive the coordinate information of the mobile terminal 210 from a location tracking device. Where the mobile terminal 210 receives the coordinate information of the mobile terminal 210 from such a location tracking device, the mobile terminal 210 can receive the coordinate information through the communicating unit 360, for example.

Further, the tracked current location is delivered to the packet generating unit 350, and the packet generating unit 350 generates an information request packet with reference to the command transmitted from the input unit 310. In this regard, the packet generating unit 350 checks or determines if the command signature is included in the command to prepare to generate the information request packet. Also, the packet generating unit 350 checks or determines if the user-designated location or the movement route is included in the command to determine whether the location tracking unit 330 is to track the current location. Thus, where the user-designated location or the movement route is included in the command, the packet generating unit 350 sets the included information as the search-requested location and generates the information request packet. Where the user-designated location or the movement route is not included in the command, the packet generating unit 350 sets the current location tracked by the location tracking unit 330 as the search-requested location and generates the information request packet.

The information request packet generated by the packet generating unit 350 can include at least one of a terminal phone number, a display type, and a designated location. The designated location can be the current location tracked by the location tracking unit 330, the user-designated location input by the user, or the movement route, for example. Also, an exemplary information request packet, according to aspects of the invention, is further described in the discussion of FIG. 7.

The information request packet generated by the packet generating unit 350 is transmitted to the location service providing device 240 through the communicating unit 360. The communicating unit 360, such as a suitable transmitter/receiver, transmits the information request packet received from the packet generating unit 350, and the communicating unit 350 receives information in relation to a wireless LAN available in the search-requested location, in response to the transmitted information request packet. If there is no wireless LAN available in the search-requested location, the communicating unit 360 can receive location information of a wireless LAN located near or around the search-requested location. The communicating unit 360 typically performs radio communication with the base station 220 using a suitable mobile communication method, such as frequency division multiple access (FDMA), time division multiple access (TDMA), code division multiple access (CDMA), or global system for mobile communication (GSM).

The location information can include at least one of the type(s) of a wireless LAN located near, around or in the designated location, the coordinates of a repeater of the wireless LAN located near, around or in the designated location, or a distance between the designated location and the repeater, for example. While the designated location can be the current location of the mobile terminal 210, which is tracked by the location tracking unit 330, the designated location can also be the user-designated location or the movement route, for example, and the designated location is not limited in this regard.

The received location information in relation to the repeater is transmitted to the control unit 340 and the control unit 340 transmits the location information to the display unit 320 to display the received location information. The display unit 320 displays the received location information, such as including the received search result regarding the wireless LAN. The display unit 320 is of a suitable display type, and can be a display device to visually display the location information or a speaker device, or both a display device and a speaker device, or other suitable display type, for example. Where the display unit 320 is a visual type display device, the display device can be, for example, a panel capable of displaying an image or text, such as a liquid crystal display (LCD), and the display device can be embedded in the mobile terminal 210 or connected to the mobile terminal 210 as an external device, according to aspects of the invention.

The displayed search result can include the type(s) of a wireless LAN available in the designated location, or location information in relation to a wireless LAN located around or near the designated location, if there is no wireless LAN available in the designated location. Also, an exemplary display format is further described in the discussion of FIGS. 9A through 9C.

Figure 4:
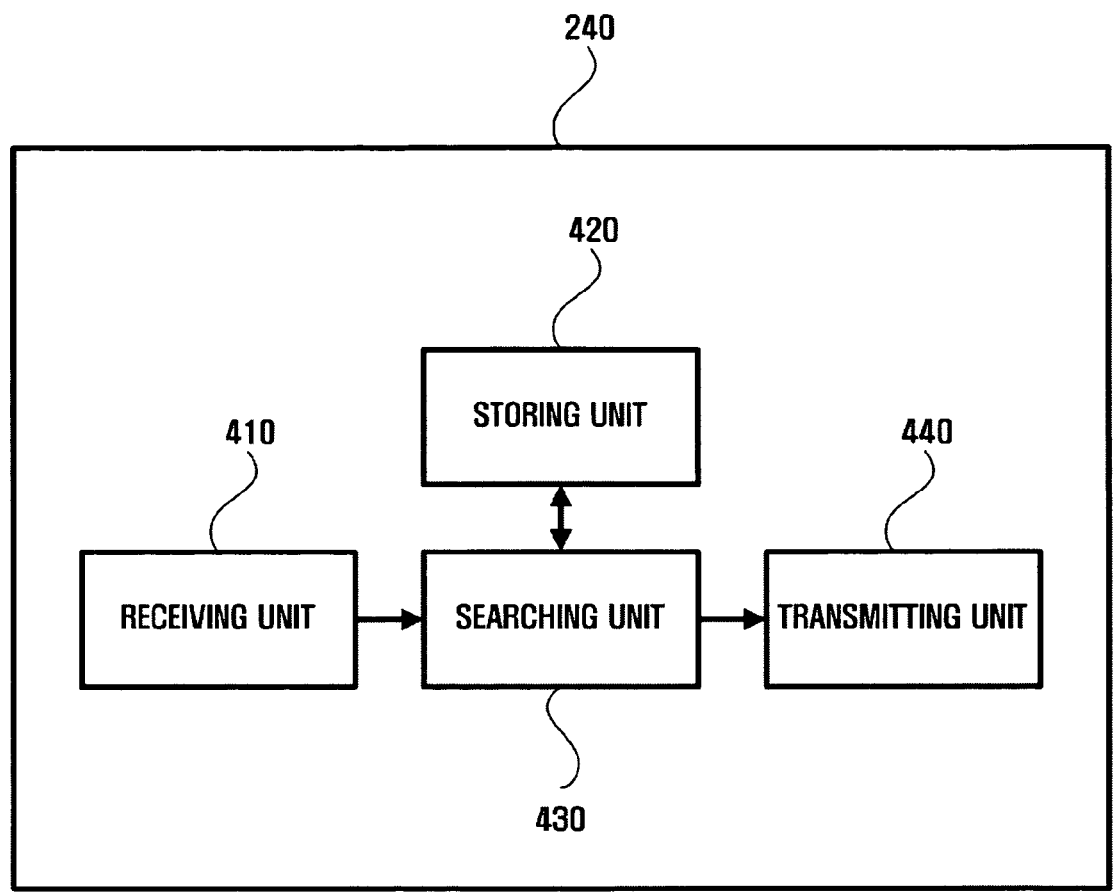
FIG. 4 is a block diagram of a location service providing device to display the availability of a wireless LAN according to an embodiment of the invention.

FIG. 4 is a block diagram of the location service providing device 240 to display the availability of a wireless LAN according to an embodiment and aspects of the invention. The location service providing device 240 includes a storing unit 420, a receiving unit 410, a searching unit 430, and a transmitting unit 440. The location service providing device 240 provides information in relation to a wireless LAN available to the user, and the location service providing device 240 can be operated, for example, by a mobile communication operator or a separate operator. Since the location service providing device 240 typically receives the information request packet from the mobile terminal 210 of the user, the location service providing device 240 can be directly or indirectly connected to the switching center 230 of the mobile communication operator, according to aspects of the invention.

The storing unit 420 stores a wireless LAN database. The wireless LAN database can include at least one of the coordinates of a repeater for the type(s) of wireless LAN, a table including the radio range of the repeater, or a map created according to, or corresponding to, the table. The table and coordinates typically can be updated by a manager. The receiving unit 410 receives the information request packet from the mobile terminal 210. As discussed, the information request packet typically includes at least one of a terminal phone number, a display type, or the search-requested location. The receiving unit 410 is typically directly or indirectly connected to the switching center 230 of the mobile communication operator to receive the information request packet.

The received information request packet is transmitted to the searching unit 430 and the searching unit 430 searches for the type(s) of a wireless LAN available in the search-requested location by referring to the wireless LAN database stored in the storing unit 420 in response to the received information request packet. In this regard, the searching unit 430 refers to the wireless LAN database that is stored for the type(s) of wireless LAN to check if there is a wireless LAN available in the search-request location included in the information request packet, and checks if the search-requested location is included in the radio range of a repeater of the available wireless LAN(s).

The found location information determined by the search can include at least one of the type(s) of a wireless LAN located around, near or in the search-requested location, the coordinates of a repeater of the wireless LAN located around, near or in the search-requested location, and/or a distance between the search-requested location and the repeater. The search-requested location can include the current location of the mobile terminal 210 and can also include the user-designated location or the departure point, the intermediate point, and/or the destination point of the movement route, if the user-designated location or the movement route is set. If there is/are no wireless LAN(s) available in the search-requested location, the searching unit 430 searches in the wireless LAN database for the location(s) of a repeater of a wireless LAN(s) located around or near the search-requested location and transmits the found location(s) to the transmitting unit 440, determined from the search.

The found type of a wireless LAN or the location information of the repeater is transmitted to the mobile terminal 210 through the transmitting unit 440. Similar to the receiving unit 410, the transmitting unit 440 can be directly or indirectly connected to the switching center 230 of the mobile communication operator. If a voice input is received from the mobile terminal 210, the location service providing device 240 converts the voice input into a predetermined format (such as, for example, a text format) for application to the table or the map. In this regard, the location service providing device 240 can include a separate or integrated converter to convert the voice input into the predetermined format.

Figure 5:
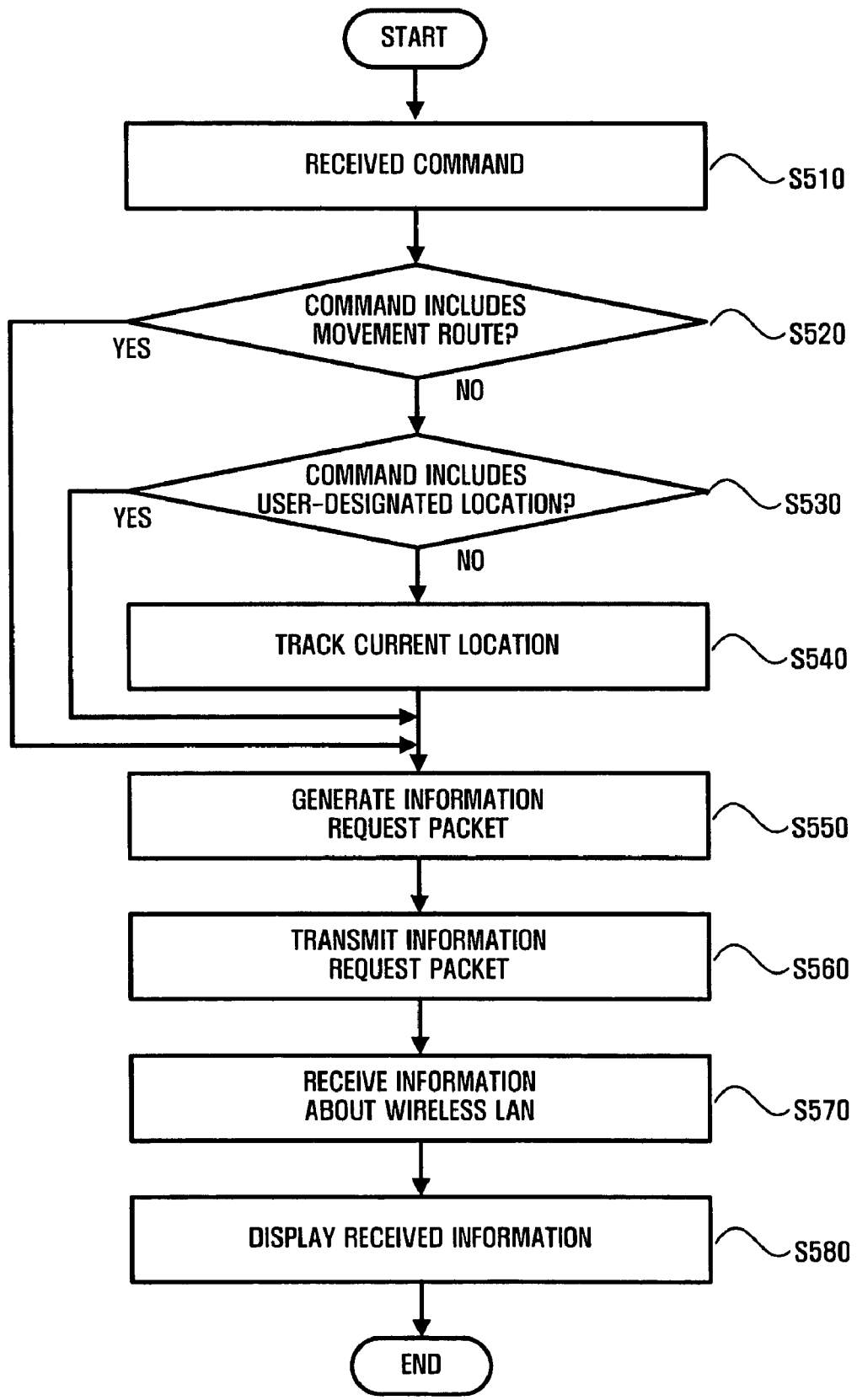
FIG. 5 is a flowchart illustrating the operation of a mobile terminal according to an embodiment of the invention.

FIG. 5 is a flowchart illustrating the operation of the mobile terminal 210 according to an embodiment of the invention. The mobile terminal 210 receives a command to request a search for an available wireless LAN from a user in operation S510. The user can input the command using a button included in the mobile terminal 210 or a voice input, for example, into a microphone of the mobile terminal 210. The command can include at least one of a command signature, a user-designated location, or a movement route.

After receipt of the command, the mobile terminal 210 checks if the command includes the movement route in operation S520. If the command includes the movement route, the mobile terminal 210 generates an information request packet with reference to the movement route in operation S550. If the command does not include the movement route, the mobile terminal 210 checks if the command includes the user-designated location in operation S530. If so, the mobile terminal 210 sets the user-designated location as a search-requested location and generates the information request packet in operation S550. If the command does not include the user-designated location, the mobile terminal 210 tracks its current location, such as by using a GPS or a mobile phone network, in operation S540, sets the tracked current location as the search-requested location, and generates the information request packet in operation S550.

The generated information request packet is transmitted through the communicating unit 360 in operation S560 and the communicating unit 360 receives the type(s) of a wireless LAN available in the search-requested location in response to the transmitted information request packet in operation S570. If there is no wireless LAN available in the search-requested location, the mobile terminal 210 receives location information of a wireless LAN located around or near the search-requested location in operation S570. The received location information can include at least one of the type(s) of a wireless LAN located around, near or in the search-requested location, the coordinates of a repeater of the wireless LAN located around, near or in the search-requested location, and/or a distance between the search-requested location and the repeater.

The received type(s) of the wireless LAN and/or location information of the wireless LAN is displayed through the display unit 320 in operation S580. The display format (such as an image, text, or voice format) is determined according to the display type included in the information request packet and, if a plurality of display formats is received, the display formats can be selectively output according to a user's selection.

Figure 6:
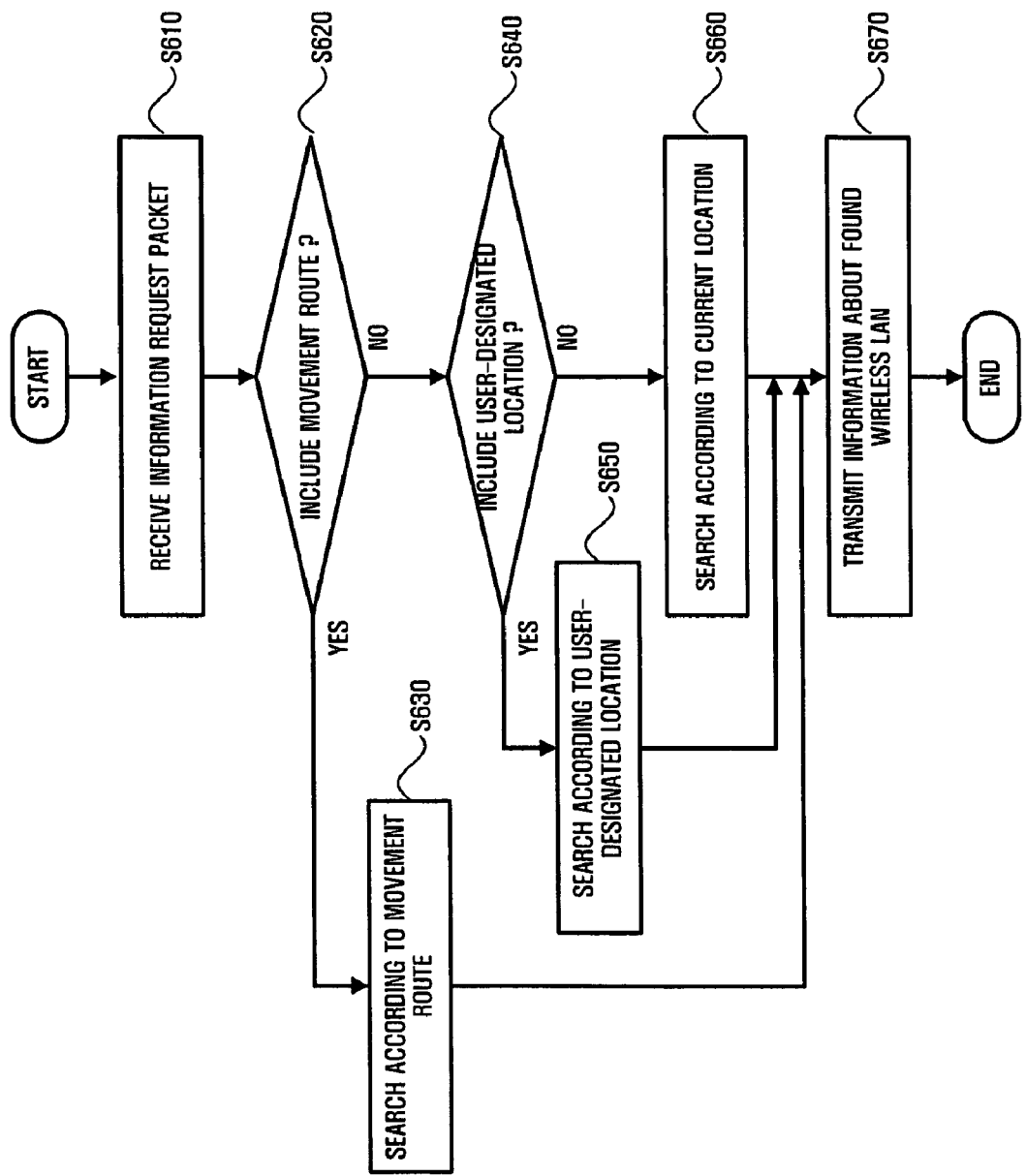
FIG. 6 is a flowchart illustrating the operation of the location service providing device according to an embodiment of the invention.

FIG. 6 is a flowchart illustrating the operation of the location service providing device 240 according to an embodiment of the invention. In response to receiving the information request packet from the mobile terminal 210 in operation S610, the location service providing device 240 searches for the type(s) of a wireless LAN available in the search-requested location by referring to the wireless database stored in the storing unit 420 in response to the received information request packet. The search is performed in a wireless LAN database stored for the type(s) of wireless LAN, and the operations of FIG. 6 are described based on a search in a wireless LAN database stored for a single type of wireless LAN, as an example, although the invention can also apply to a search for a plurality of types of wireless LANs, and the invention is not limited in this regard.

The searching unit 430 checks if the information request packet includes the movement route in operation S620. If so, the searching unit 430 checks if there is an available wireless LAN according to the movement route in operation S630. If the information request packet does not include the movement route, the searching unit 430 checks if the information request packet includes the user-designated location in operation S640. If so, the searching unit 430 checks if there is an available wireless LAN according to the user-designated location in operation S650. If the information request packet does not include the user-designated location, the searching unit 430 checks if there is an available wireless LAN according to the current location of the mobile terminal 210 in operation S660.

In the operations of FIG. 6, the checking if there is an available wireless LAN performed by the searching unit 430, in addition to checking the location information of a repeater of a wireless LAN on the movement route, also typically searches for a route in which propagation ranges of repeaters overlap to the maximum extent for a seamless service. Thus, even where the movement route is the shortest straight line, the found optimal route can be a curved route, for example. If there is no wireless LAN available in the search-requested location in operations S630, S650, and S660, the searching unit 430 searches for location information of a wireless LAN located around or near the search-requested location, and, in this regard, can search for location information of a repeater of the wireless LAN.

The type of the wireless LAN or the location information found or determined from the search is transmitted to the mobile terminal 210 through the transmitting unit 440 in operation S670. The display format (such as an image, text, or voice format) is typically determined according to the display type included in the information request packet, and, in this regard, location information according to a plurality of display formats can be transmitted, according to aspects of the invention.

Figure 7:
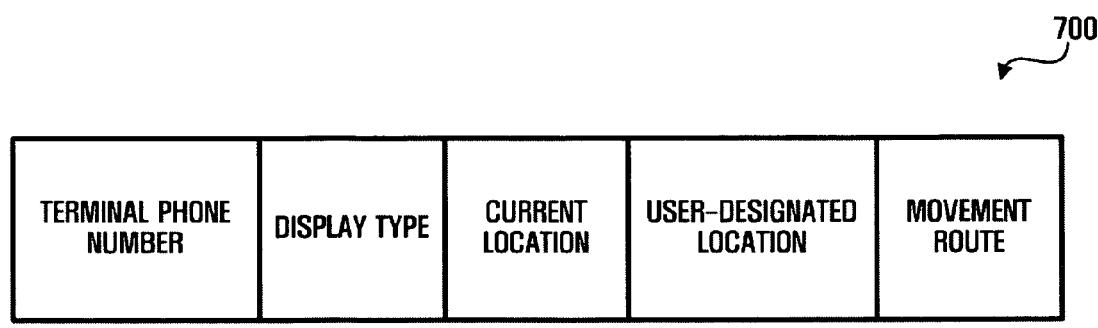
FIG. 7 illustrates an information request packet of the mobile terminal according to an embodiment of the invention.

FIG. 7 illustrates an exemplary information request packet 700 of the mobile terminal 210 according to an embodiment of and aspects of the invention. The information request packet 700 generated with reference to the current location, the user-designated location, and/or the movement route includes at least one of a terminal phone number, a display type, and/or the search-requested location, and the search-requested location can include, for example, the current location, the user-designated location and/or the movement route of the mobile terminal 210.

The terminal phone number in the information request packet 700 is a phone number of a terminal which is requested to receive information, and the location service providing device 240 transmits the type(s) of an available wireless LAN or location information of a wireless LAN to the specified terminal phone number. The terminal phone number is typically set to the phone number of the mobile terminal 210 as a default value or, alternatively, the terminal phone number can be input by the user. If the user inputs the terminal phone number, since the location service providing device 240 transmits the location information to the displayed terminal phone number, the user can receive location information of the wireless LAN through other mobile terminals instead of the mobile terminal 210.

The display type in the information request packet 700 is the display type(s) included in the mobile terminal 210, and the display type(s) can be, for example, a display device or a speaker to respectively output an image or voice according to a user's selection. The user can receive location information of the wireless LAN in the form of an image or text through the display device included in the mobile terminal 210 and/or in the form of a voice output through the speaker, for example. Also, both the display device and the speaker can be used as the display types to provide the user the received location information of the wireless LAN(s).

The search-requested location in the information request packet 700 is the current location of the mobile terminal 210 tracked by the location tracking unit 330, the user-designated location and/or the movement route input by the user. The location service providing device 240 searches for the type(s) of a wireless LAN available in the search-requested location included in the information request packet or searches for location information of a wireless LAN located around or near the search-requested location and transmits the found type or location information in response to the search request. The movement route is input in the information request packet 700 to facilitate the use of a wireless LAN where the user of the mobile terminal intends to move to another location or destination. In this regard, the user can input a departure point, an intermediate point, and/or a destination point as the movement route. The location service providing device 240 provides an optimal route for the smooth, or seamless, use of the wireless LAN on the input movement route.

Figure 8:
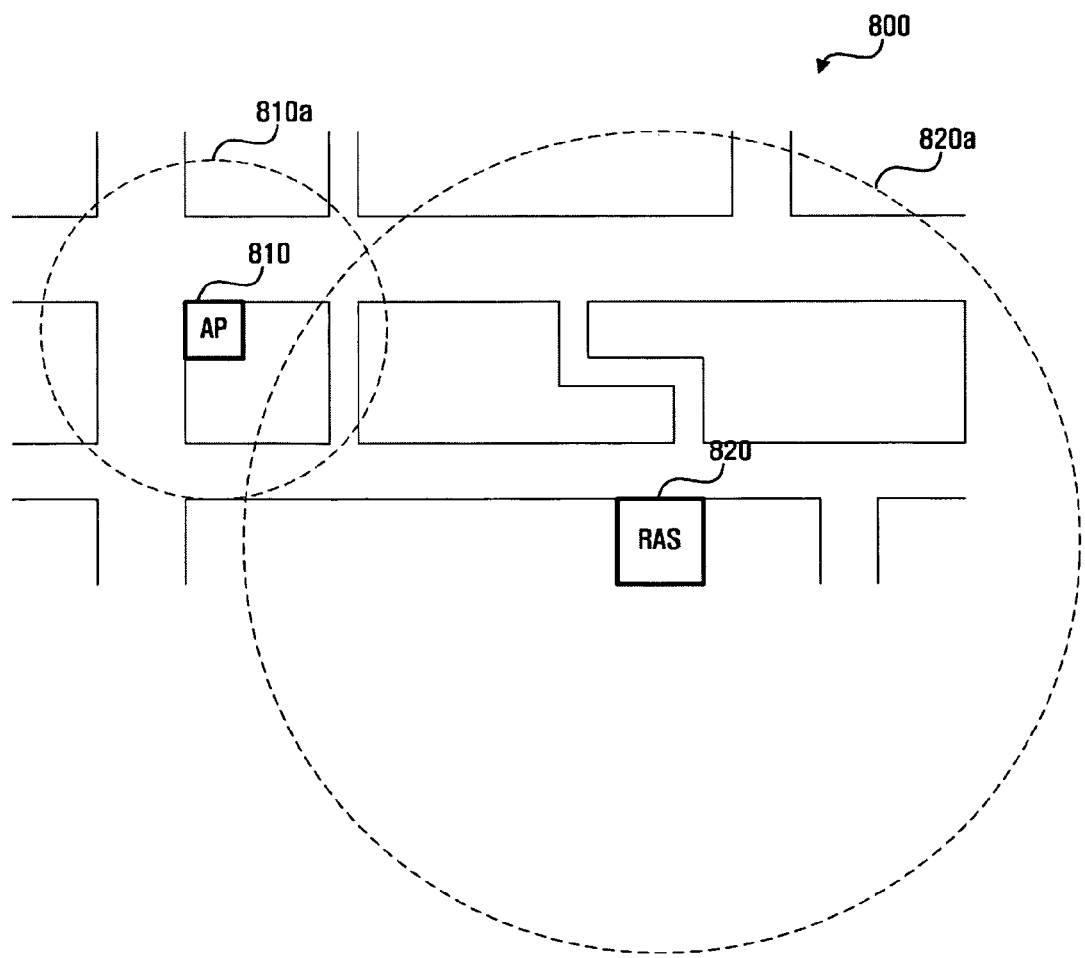
FIG. 8 illustrates the location of a repeater of a wireless LAN, which is stored in the location service providing device according to an embodiment of the invention.

FIG. 8 illustrates the location of a repeater of a wireless LAN, which is stored in the location service providing device 240, according to an embodiment and aspects of the invention. An AP 810 refers to an AP of a wireless LAN and an RAS 820 refers to a radio access station of WiBro, as exemplary types of repeaters of a wireless LAN. As discussed, the storing unit 420 of the location service providing device 240 stores the location of a repeater for the type(s) of wireless LAN in the form of a table or a map. In FIG. 8, a map 800 referring to the coordinates of a table is illustrated. The type of a repeater, such as the AP 810 and the RAS 820 and radio ranges 810a and 820a of the corresponding repeater can be displayed in the map 800. The displayed information and the found location information included in the received information request packet are re-created as a map, such as the map 800, for the corresponding section(s), and the re-created map is transmitted to the mobile terminal 210.

Figure 9A:
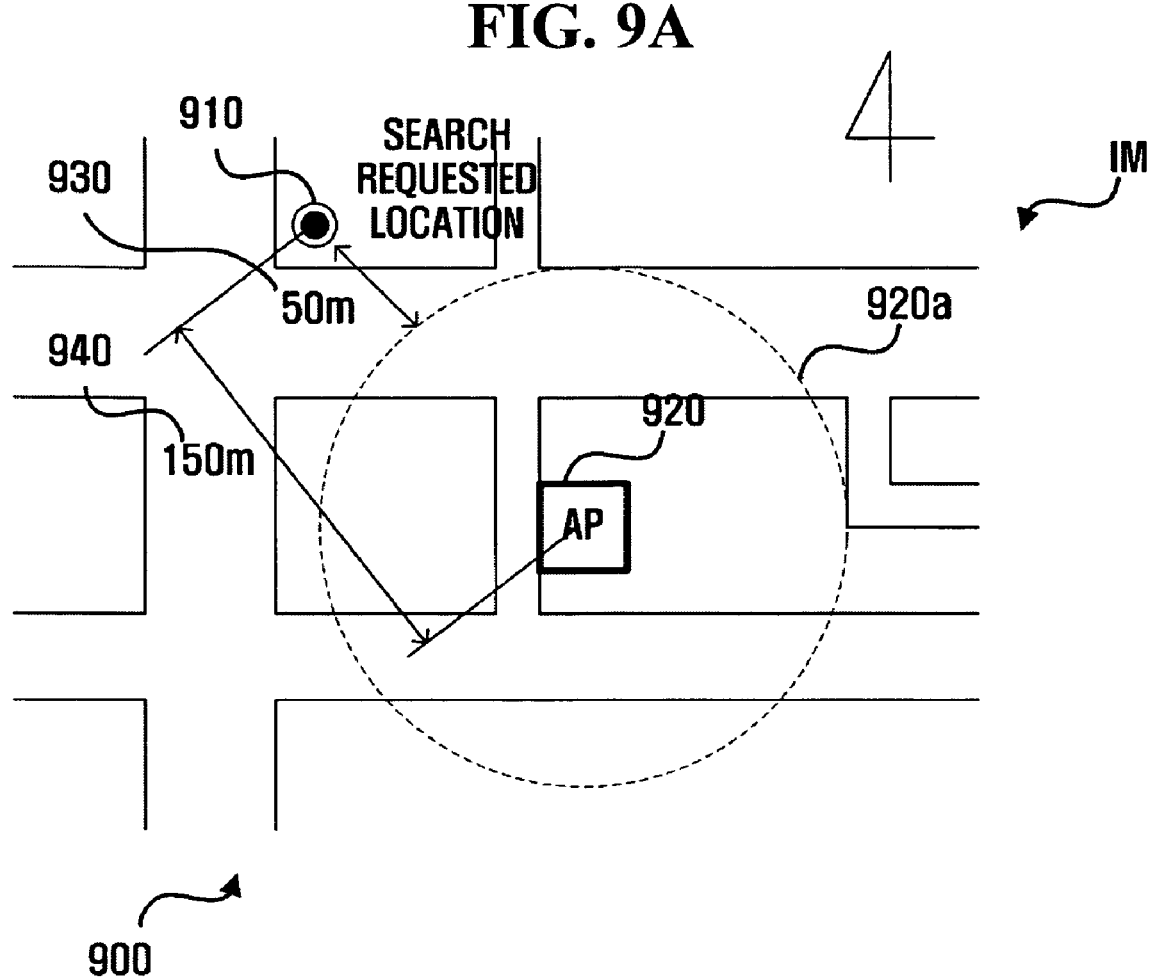
FIGS. 9A through 9C illustrate wireless LAN location information output from the mobile terminal according to an embodiment and aspects of the invention.
Figure 9B:
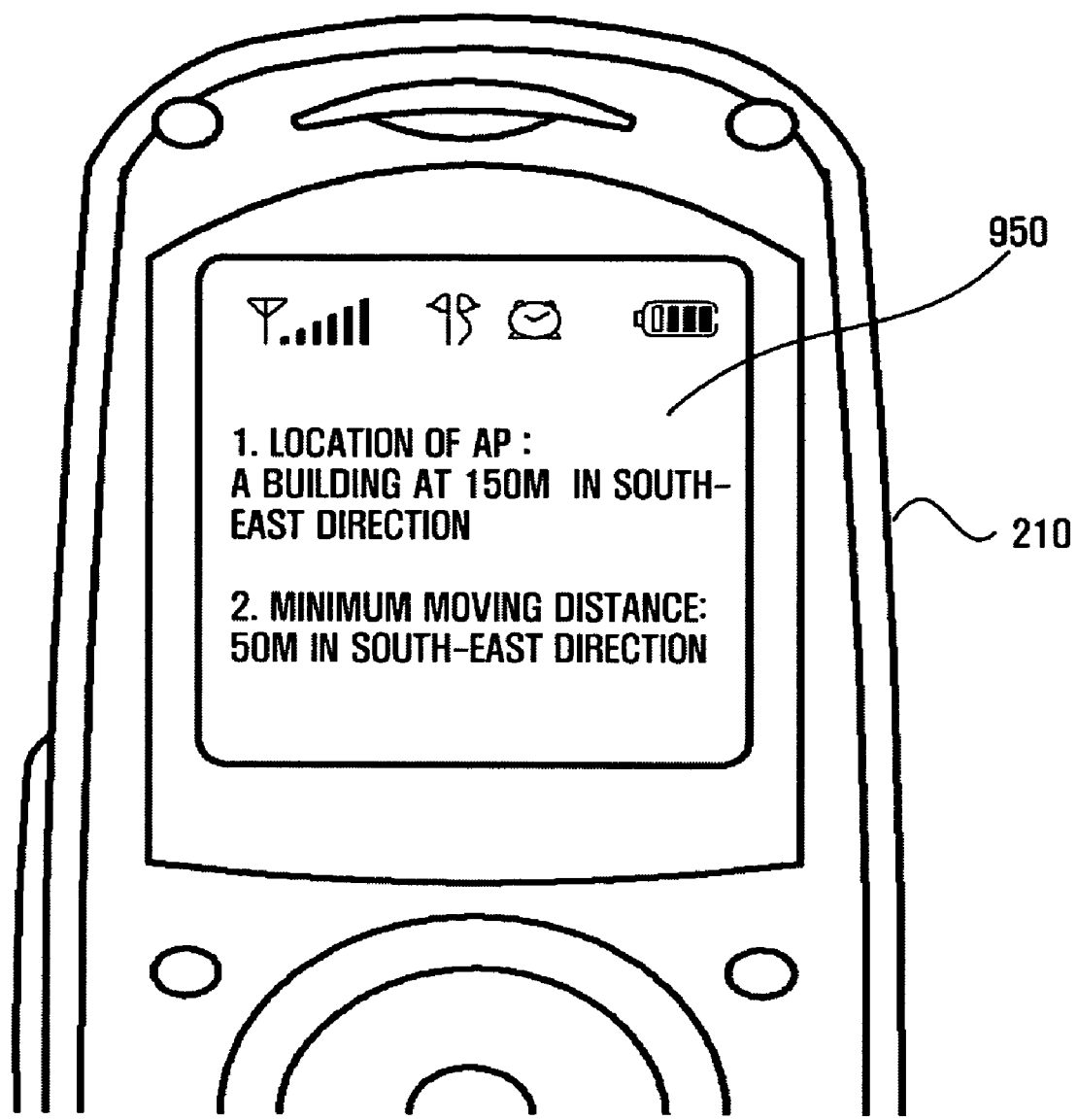
Figure 9C:
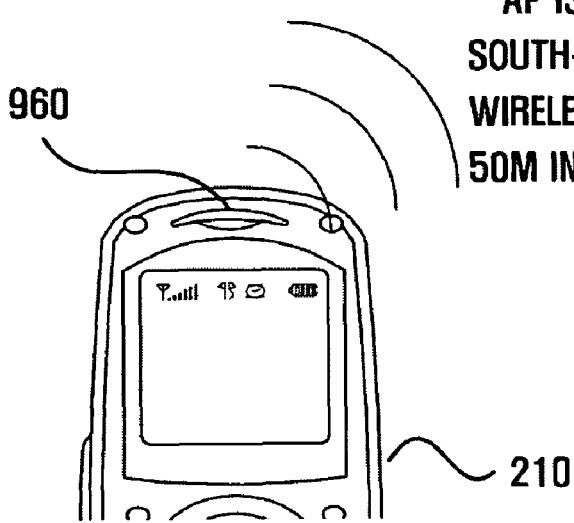

FIGS. 9A through 9C illustrate exemplary wireless LAN location information output from the mobile terminal 210 according to an embodiment and aspects of the invention. FIG. 9A illustrates location information output as an image IM through the display device of the mobile terminal 210, such as a display device 950 of the mobile terminal 210 of FIG. 9B. FIG. 9B illustrates location information output as text through the display device 950 of the mobile terminal 210. FIG. 9C illustrates location information output as a voice output through the speaker 960 of the mobile terminal 210.

If there is a wireless LAN available in the search-requested location, the mobile terminal 210 receives the type(s) of a wireless LAN and displays the received type(s), such as through the display device 950 or the speaker 960 of the mobile terminal 210. In FIGS. 9A through 9C, if there is no wireless LAN available in the search-requested location, location information of a wireless LAN located around or near the search-requested location is received and displayed, such as through the display device 950 or the speaker 960 of the mobile terminal 210. The user can select a display type prior to transmission of the information request packet, such as the information request packet 700, using the mobile terminal 210. In FIGS. 9A through 9C, exemplary display formats according to a user's selection are illustrated, although the invention is not limited in this regard.

Where location information of a repeater 920 is received in the exemplary form of a map 900, as illustrated in FIG. 9A, the received map 900 displays the repeater 920 and a search-requested location 910, together with neighboring roads and neighboring buildings, for example. Since the map 900 also displays a distance 940 between the search-requested location 910 and the repeater 920, and a distance 930 between the search-requested location 910 and a radio range 920a of the repeater 920, the user can be provided with a typically smooth, or seamless, service by moving to the radio range 920a of the repeater 920 according to the displayed map 900.

Where location information of the repeater 920 is received in the form of text, such as illustrated on the display device 950 of the mobile terminal 210 in FIG. 9B, the received text typically includes the location and the direction of the repeater 920. Since the received text typically also displays a minimum moving distance and a moving direction according to which the user should move to receive service, the user can be provided with a typically smooth, or seamless, service by moving the displayed distance in the displayed direction.

Where location information of the repeater 920 is received in the form of a voice output, such as through the speaker 960 of the mobile terminal 210, as illustrated in FIG. 9C, the received voice location information output through the speaker 960 typically includes the location and direction of the repeater 920. Since the received voice location information typically also includes a moving distance and a moving direction according to which the user should move to receive a service, the user can be provided with a typically smooth, or seamless, service by moving the provided distance in the provided direction.

As described, apparatus and methods to display the availability of a wireless local area network (LAN) according to aspects and embodiments of the invention provide various advantages. One advantage, among various advantages, of the invention includes promoting convenience in use of a mobile terminal to a user, such as a user carrying a mobile phone, by providing information about an area supporting a wireless LAN through a mobile phone network. Another advantage, among various advantages, of the invention includes enabling or assisting a user of a mobile terminal, such as user of a mobile phone, to determine an optimal movement route by providing information about an area supporting the wireless LAN according to a user's movement route, such as where the user intends to move to another location or destination.

The foregoing embodiments, aspects and advantages are merely exemplary and are not to be construed as limiting the invention. Also, the description of the embodiments of the invention is intended to be illustrative, and not to limit the scope of the claims, and various other alternatives, modifications, and variations will be apparent to those skilled in the art. Therefore, although a few embodiments of the invention have been shown and described, it would be appreciated by those skilled in the art that changes may be made in the embodiments without departing from the principles and spirit of the invention, the scope of which is defined in the claims and their equivalents.

What is claimed is:

1. An apparatus to display availability of a wireless local area network (LAN), the apparatus comprising:
   an input unit to receive a command to request a search for a wireless LAN available in a designated location;
   a packet generating unit to generate an information request packet according to the received command, the generated information request packet including the designated location;
   a communicating unit to transmit the generated information request packet and to receive a result of the requested search for the available wireless LAN through a mobile communication network, in response to the transmitted information request packet; and a display unit to display the received result of the search, wherein the packet generating unit sets a user-designated location or a movement route, where included in the received command, as the designated location to generate the information request packet, and wherein the result of the requested search for the available wireless LAN includes a route to promote enabling of a smooth or seamless use of wireless LAN by a mobile terminal on the movement route.

2. The apparatus of claim 1, wherein:

the designated location includes one or more of a current location, a user-designated location, or a movement route.

3. The apparatus of claim 2, wherein:

the information request packet further includes a terminal phone number and/or a display type.

4. The apparatus of claim 2, wherein:

the user-designated location includes one or more of spatial coordinates or an address of the designated location, a building name or a landmark corresponding to the designated location; and the movement route includes one or more of a departure point, an intermediate point or the destination point of the movement route, or the departure point and the destination point of the movement route.

5. The apparatus of claim 1, wherein:

the command includes one or more of a command signature, a user-designated location, or a movement route.

6. The apparatus of claim 1, further comprising:

a location tracking unit to track a current location, if the command does not include a user-designated location or a movement route.

7. The apparatus of claim 6, wherein:

the location tracking unit tracks the current location using one or more of a global positioning system (GPS) or a mobile phone network.

8. The apparatus of claim 1, wherein:

the received result of the search comprises a type of the wireless LAN available in the designated location.

9. The apparatus of claim 1, wherein the received result of the search comprises location information of a wireless LAN located around or near the designated location, if there is no wireless LAN available in the designated location.

10. The apparatus of claim 8, wherein:

the location information of the wireless LAN comprises one or more of a type of the wireless LAN located around or near the designated location, the coordinates of a repeater of the wireless LAN located around or near the designated location, or a distance between the designated location and the repeater of the wireless LAN located around or near the designated location.

11. The apparatus of claim 1, wherein:

the designated location includes one or more of a current location, the user-designated location, or the movement route;

the information request packet further includes terminal phone number and/or a display type; and the command includes one or more of a command signature, a user-designated location, or a movement route.

12. The apparatus of claim 1, wherein:

the packet generating unit sets a current location of the mobile terminal as the designated location, where the user-designated location or the movement route is not included in the received command, to generate the information request packet.

13. The apparatus of claim 1, wherein:

the received result of the search comprises location information including one or more of neighboring roads and neighboring buildings, a distance between the designated location and the available wireless LAN, or a distance between the designated location and a radio range of the available wireless LAN.

14. The apparatus of claim 13, wherein:

the received result of the search comprises the location information displayed by the display unit in the form of a map, text, image or voice output.

15. The apparatus of claim 1, wherein:

the received result of the search comprises location information including one or more of a location of the available wireless LAN, a direction of the available wireless LAN, or a moving distance and a moving direction to receive service by the available wireless LAN.

16. The apparatus of claim 15, wherein:

the received result of the search comprises the location information displayed by the display unit in the form of a map, text, image or voice output.

17. A method to display availability of a wireless local area network (LAN), the method comprising:

receiving a command to request a search for a wireless LAN available in a designated location;

generating an information request packet according to the received command-generated information request packet including the designated location;

transmitting the generated information request packet for the search for the wireless LAN available in the designated location through a mobile communication network;

receiving the result of the requested search for the available wireless LAN in response to the transmitted information request packet through the mobile communication network; and displaying the received result of the search, wherein a user-designated location or a movement route, where included in the received command, are set as the designated location to generate the information request packet, and wherein the result of the requested search for the available wireless LAN includes a route to promote enabling of a smooth or seamless use of wireless LAN by a mobile terminal on the movement route.

18. The method of claim 17, wherein:

the designated location comprises one or more of a current location of the mobile terminal, a user-designated location, or a movement route of the mobile terminal.

19. The method of claim 18, wherein:

the information request packet further comprises terminal phone number and/or a display type.

20. The method of claim 17, wherein:

the command comprises one or more of a command signature, a user-designated location, and a movement route of the mobile terminal.

21. The method of claim 17, further comprising:

tracking a current location of the mobile terminal, if the command does not include a user-designated location and a movement route of the mobile terminal.

22. The method of claim 21, further comprising:

tracking the current location of the mobile terminal by one or more of a global positioning system (GPS) or a mobile phone network.

23. The method of claim 17, wherein:
the received result of the search comprises a type of the wireless local area network (LAN) available in the designated location.

24. The method of claim 17, wherein:
the received result of the search comprises location information of a wireless LAN located around or near the designated location, if there is no wireless LAN available in the designated location.

25. The method of claim 24, wherein:
the location information of the wireless LAN comprises one or more of a type of the wireless LAN located around or near the designated location, coordinates of a repeater of the wireless LAN located around or near the designated location, or a distance between the designated location and the repeater of the wireless LAN located around or near the designated location.

26. The method of claim 17, wherein:
the designated location comprises one or more of a current location of the mobile terminal, the user-designated location, or the movement route of the mobile terminal;
the information request packet comprises one or more of a terminal phone number, a display type, or the designated location; and
the command comprises one or more of a command signature, a user-designated location, and a movement route of the mobile terminal.

27. The method of claim 17, wherein the generating the information request packet comprises:
generating the information request packet with reference to the movement route of the mobile terminal, when the received command includes the movement route of the mobile terminal;
generating the information request packet with reference to the user-designated location of the mobile terminal, when the received command includes the user designated location of the mobile terminal and does not include the movement route of the mobile terminal; and
generating the information request packet with reference to a current location of the mobile terminal, when the received command does not include the user designated location of the mobile terminal and does not include the movement route of the mobile terminal.

28. The method of claim 17, wherein the generating the information request packet further comprises:
tracking the current location of the mobile terminal to generate the information request packet, when the received command does not include the user designated location of the mobile terminal and does not include the movement route of the mobile terminal.

29. The method of claim 28, further comprising:
tracking the current location of the mobile terminal by one or more of a global positioning system (GPS) or a mobile phone network.

30. An apparatus to display availability of a wireless local area network (LAN), the apparatus comprising:
an input unit to receive a command to request a search for a wireless LAN available in a designated location;
a packet generating unit to generate an information request packet according to the received command, the generated information request packet including the designated location;
a communicating unit to transmit the generated information request packet and to receive a result of the requested search for the available wireless LAN through a mobile communication network, in response to the transmitted information request packet; and
a display unit to display the received result of the search, wherein:
the packet generating unit sets a current location of a mobile terminal as the designated location, where a user-designated location or a movement route is not included in the received command, to generate the information request packet, and
wherein the result of the requested search for the available wireless LAN includes a route to promote enabling of a smooth or seamless use of wireless LAN by the mobile terminal on the movement route.

31. An apparatus to display availability of a wireless local area network (LAN), the apparatus comprising:
an input unit to receive a command to request a search for one or more wireless local area networks (LANs) available around or near a designated location;
a packet generating unit to generate an information request packet according to the received command, the generated information request packet including the designated location;
a communicating unit to transmit the generated information request packet and to receive a result of the requested search for the one or more available wireless LANs around or near the designated location through a mobile communication network, in response to the transmitted information request packet; and
a display unit to display the received result of the search,
wherein the packet generating unit sets a user-designated location or a movement route, where included in the received command, as the designated location to generate the information request packet, and
wherein the result of the requested search for the available wireless LAN includes a route to promote enabling of a smooth or seamless use of wireless LAN by a mobile terminal on the movement route.

32. An apparatus to display availability of a wireless local area network (LAN), the apparatus comprising:
an input unit to receive a command to request a search for one or more wireless local area networks (LANs) available on a movement route of a mobile terminal;
a packet generating unit to generate an information request packet according to the received command, the generated information request packet including the movement route;
a communicating unit to transmit the generated information request packet and to receive a result of the requested search for the one or more available wireless LANs on the movement route of the mobile terminal, in response to the transmitted information request packet; and
a display unit to display the received result of the search, and
wherein the result of the requested search for the available one or more wireless LANs includes a route to promote enabling of a smooth or seamless use of wireless LAN by the mobile terminal on the movement route.

* * * * *

UNITED STATES PATENT AND TRADEMARK OFFICE
CERTIFICATE OF CORRECTION

PATENT NO. : 8,315,232 B2  
APPLICATION NO. : 11/417138  
DATED : November 20, 2012  
INVENTOR(S) : Soo-hong Park Page 1 of 1

It is certified that error appears in the above-identified patent and that said Letters Patent is hereby corrected as shown below:

In the Claims

In Col. 13, Line 41, In Claim 9, delete "wherein" and insert -- wherein: --, therefor.

In Col. 13, Line 46, In Claim 10, delete "claim 8," and insert -- claim 9, --, therefor.

Signed and Sealed this
Fifteenth Day of October, 2013

Teresa Stanek Rea
*Deputy Director of the United States Patent and Trademark Office*